Sept. 2, 1930.       J. M. ANDERSEN       1,774,628
MANHOLE SWITCH
Filed June 17, 1925       3 Sheets-Sheet 1

Inventor
Johan M. Andersen
by Jas. H. Churchill
his Atty

Sept. 2, 1930. J. M. ANDERSEN 1,774,628
MANHOLE SWITCH
Filed June 17, 1925 3 Sheets-Sheet 3

Inventor
Johan M. Andersen
by Jas. H. Churchill
his Atty

Patented Sept. 2, 1930

1,774,628

UNITED STATES PATENT OFFICE

JOHAN M. ANDERSEN, OF BROOKLINE, MASSACHUSETTS, ASSIGNOR TO ALBERT & J. M. ANDERSON MANUFACTURING COMPANY, OF BOSTON, MASSACHUSETTS, A CORPORATION OF MASSACHUSETTS

MANHOLE SWITCH

Application filed June 17, 1925. Serial No. 37,710.

This invention relates to a manhole switch or junction box circuit breaker such as is commonly used in the streets of cities and like places, and usually comprising a metal box or casing and a circuit breaker or switch proper which is located in said box or casing. Junction boxes of this character as now constructed and known to me are provided within the box or casing with fixed bus bars to which the cables carrying the current are connected and the circuit breaker or switch proper is also fastened to said bus bars.

In junction boxes of this construction, it is necessary for the operator to insert his hand or hands into the box to assemble the apparatus and to disconnect the breaker from the bus bars, which is vary hazardous with the current on, as the operator is exposed to the danger of losing his life, and further as the tools necessary to make the proper connections are liable to effect short circuits and cause material damage. Furthermore, the box or casing has to be made relatively large to afford room enough for the operator to work and manipulate his tools, and these large junction boxes are expensive.

The present invention has for its object to provide a superior manhole switch with which the liability of loss of life and the formation of short circuits are eliminated or at least reduced to a minimum, and with which cost of construction and maintenance is materially reduced.

To this end, the use of bus bars is dispensed with, and the cables are provided with terminal members, to which are fastened terminal members for the breaker unit or switch proper, which is capable of being bodily moved into and out of the box or casing without the necessity of the operator inserting his hand or hands therein.

The particular features of the invention will be pointed out in the claims at the end of this specification.

Figure 1:
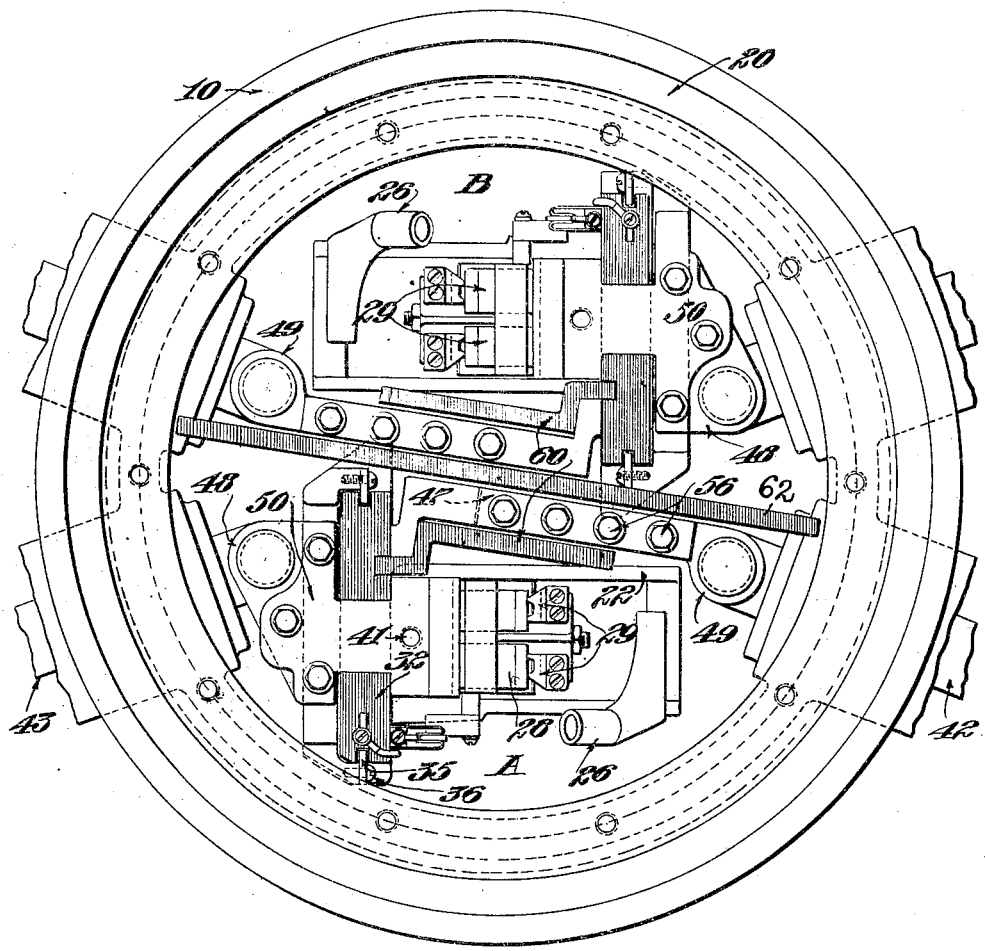
Figure 2:
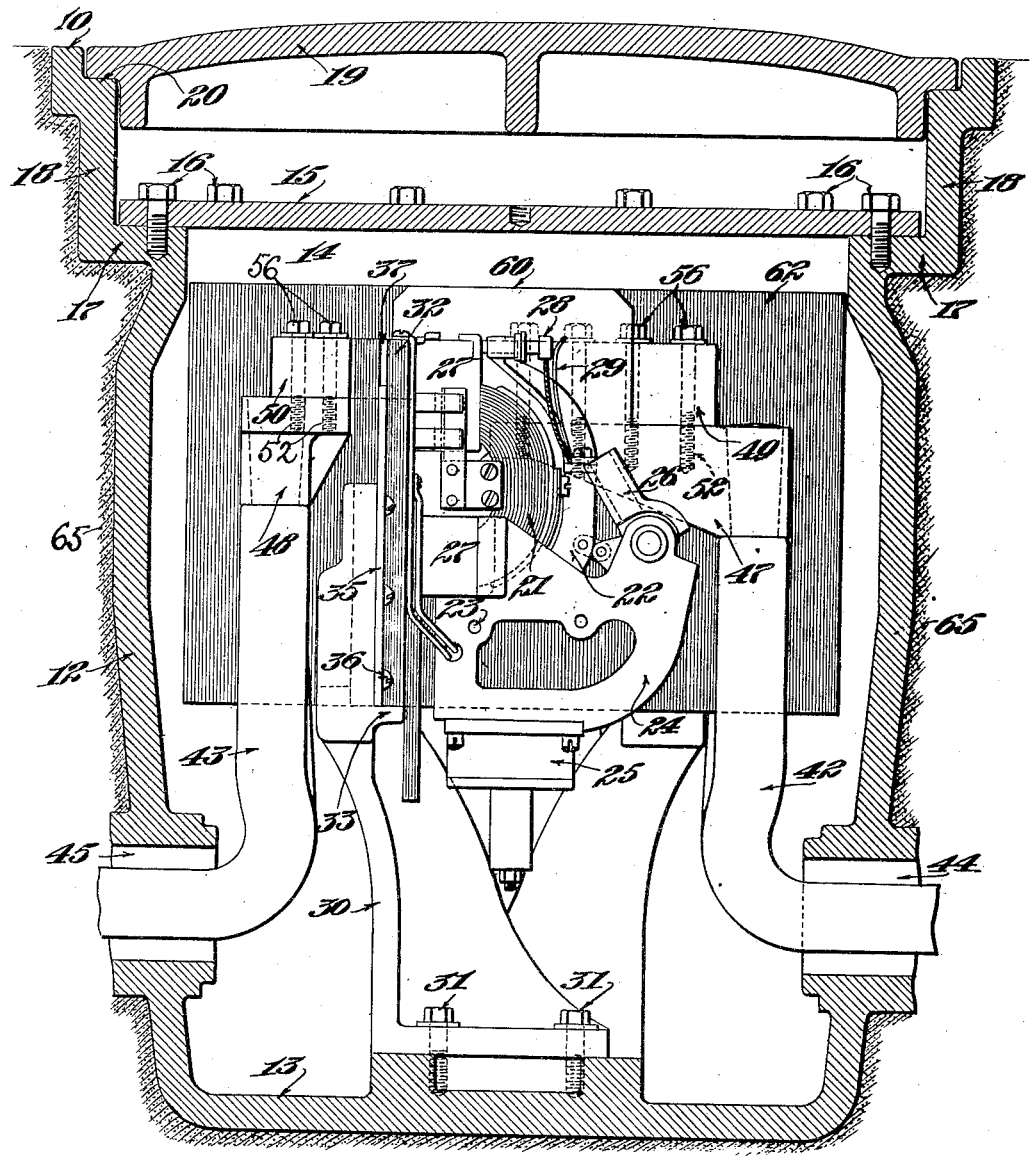
Figure 3:
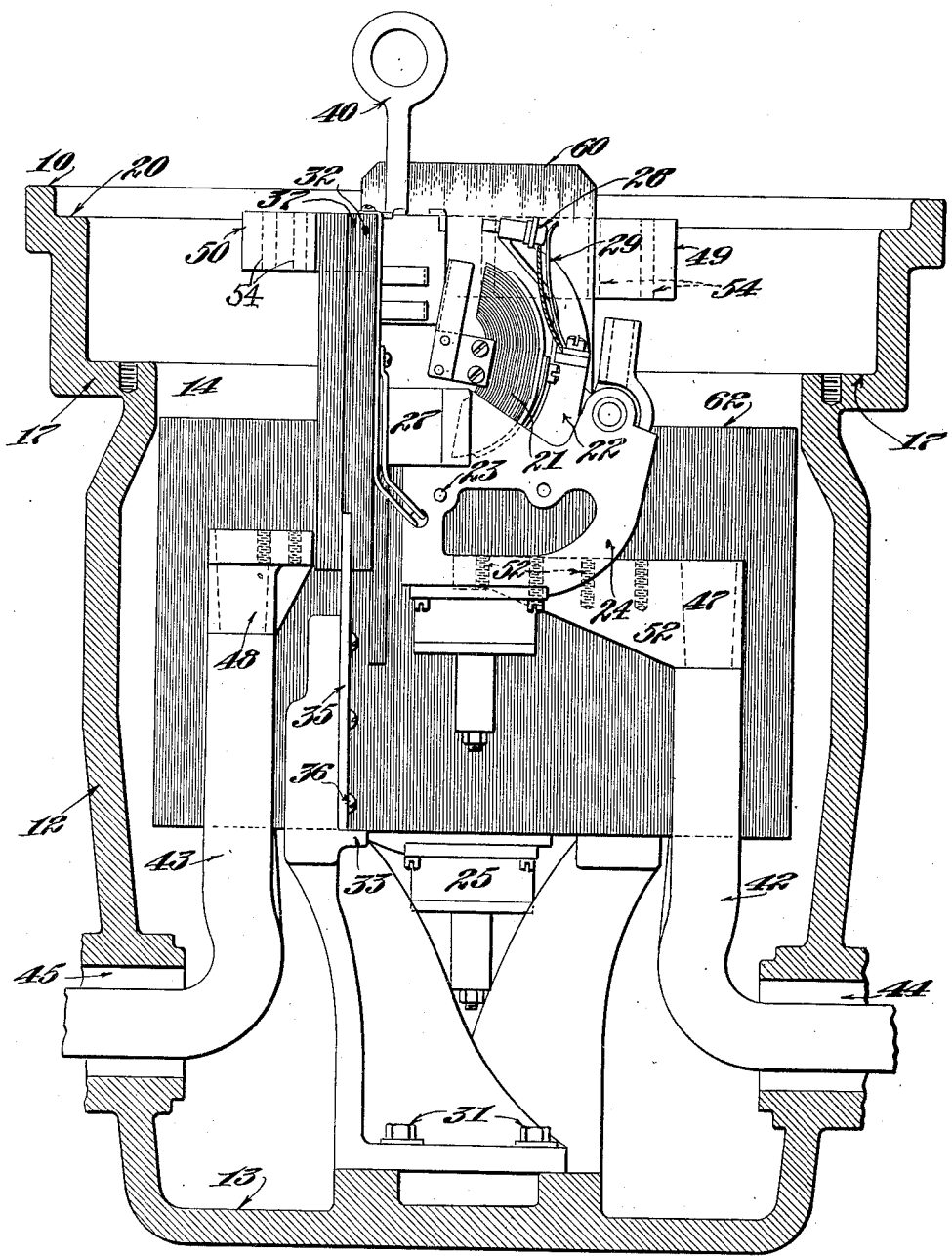

Figure 1 is a plan of a manhole switch embodying this invention, with the cover removed;

Fig. 2 a vertical section and elevation of the manhole switch shown in Fig. 1, the box being shown in section which is taken through the openings for the cables, and Fig. 3 a view like Fig. 2 with one of the breaker units partially withdrawn from the box or casing.

In the present instance the invention is shown as embodied in a manhole switch in which two breaker units are located. These units are lettered A and B, and as they are of like construction a detailed description of the manner in which one is arranged and operatively connected with the line conductors within the junction box will suffice for both.

Referring to the drawing, 10 represents a junction box or casing, usually of iron or steel and provided with a body portion 12, having a bottom 13 at its lower end and provided with an opening or mouth 14 at its upper end.

The opening 14 is designed to be closed by a cover 15 secured by screws 16 to a shoulder 17 formed by an enlarged rim 18 on said body portion. The rim 18 is closed by a removable cover 19 resting on a shoulder 20 formed therein. Within the box or casing 10 is located a circuit breaker unit, which may be of any suitable construction capable of handling the current flowing through the circuit in which the breaker or switch proper is included. Inasmuch as the specific construction of the breaker or switch forms no part of the present invention, it is deemed unnecessary to describe the same in detail, and it is believed it will suffice to point out that in the breaker or switch illustrated in the drawings, 21 is the main movable contact member which is carried by a lever 22, pivoted at 23, to a supporting frame 24, and operatively connected with an electromagnet 25 and with a hand operated lever 26. The movable contact member 21 cooperates with fixed terminals or contact members 27 with which also cooperates an auxiliary contact member 28 actuated by a spring arm or member 29 affixed to the lever 22.

The breaker or switch, in accordance with this invention, is bodily movable into and out of the box or casing 10 through the opening 14 therein, when the covers 15, 19 are removed.

Provision is made for supporting the breaker unit within the box or casing 10, and to this end, a metal upright member or bracket 30 is erected upon the bottom 13 of the box or casing and is firmly secured thereto by screws 31.

Provision is made for insulating the breaker unit from the metal supporting member 30, and to this end the breaker unit is secured to a slab or member 32 of insulating material which is designed to rest on a shoulder or wall 33 on the supporting member or bracket 30, when the breaker unit is in its operative position within the box or casing 10, as shown in Fig. 2.

Provision is made for guiding the breaker unit or switch in its movement into and out of the junction box or casing 10, which is effected in the present instance by means of guiding bars or members 35, secured to the bracket or supporting member 30, as by screws 36, and by means of channels, slots or ways 37 formed in the opposite sides of the insulating slab or member 32 and into which the guide bars 35 extend. In Fig. 3, the breaker unit is represented as partially withdrawn from the junction box or casing, and by reference to Fig. 3, it will be seen that the breaker unit is slidably mounted on its supporting member and is insulated therefrom. The breaker unit may be removed from the junction box or casing without the necessity of the operator inserting his hand or hands therein, and in the present instance a lifting device or eye bolt 40 is employed, which is detachably secured to the breaker unit, it being threaded at its lower end to enter a threaded socket or hole 41, see Fig. 1, in the top of the breaker unit.

The breaker unit is designed to be connected in the line circuit within the junction box, which line circuit is represented by the cables or conductors 42, 43 which are usually led into the junction box through openings 44, 45 in the body portion thereof as represented in the drawing.

Provision is made for connecting the breaker unit with the cables 42, 43 in such manner as to permit the breaker unit to be connected with and disconnected from the said cables by the operator from outside the junction box and without necessitating the insertion of the hand into said box. To this end, circuit terminal members 47, 48 are attached to the cables 42, 43 and cooperating circuit terminal members 49, 50 are attached to the breaker unit and arranged with respect to the terminal members attached to the cables so as to align therewith when the breaker unit is in its operative position within the junction box as shown in Fig. 2.

The terminal members 47, 48 attached to and supported by the cables are preferably made in the form of metal blocks, which are provided with threaded sockets or openings 52 extended into the blocks from the upper surfaces thereof. The terminal members 49, 50 attached to the breaker unit are also preferably made in the form of metal blocks and are provided with holes 54 which extend from the upper surfaces of the blocks through the same in alignment with the threaded sockets 52 in the cable terminal members. The breaker terminal members or blocks 49, 50 are firmly secured to the cable terminal members or blocks 47, 48 by bolts 56 which pass freely through the holes 54 in the breaker terminal members 49, 50, and whose threaded ends engage the threaded sockets 52 in the cable terminal members. The bolts 56 are provided with the usual heads which lie upon the upper surface of the breaker terminal member and are capable of being engaged by a suitable tool such as a socket wrench, not shown, which may be of sufficient length to be worked by the operator from above the breaker unit and outside of the junction box. In Fig. 2, the breaker unit is shown in its operative position and its terminal members 49, 50 are in contact with the cable terminals 47, 48, thereby electrically connecting the breaker unit with the cables. If it should be desired to remove the breaker unit from the junction box for repairs or other purpose, it is only necessary for the operator to remove the covers 19, 15, and remove the bolts 56, which he can do by means of a socket wrench from above and outside of the junction box and without danger of touching his hand or hands to live metal parts within the junction box. When the bolts 56 have been removed, the breaker unit may be withdrawn by means of the eye bolt or tool 40, as above described.

A new breaker unit may then be inserted into the junction box and guided into its operative position, shown in Fig. 2. The bolts 56 are then passed through the breaker terminals 49, 50 and engaged with the threaded sockets 52 in the cable terminal members, and the latter are then drawn up into intimate or firm contact with the breaker terminal members by means of the said bolts.

Provision is made for shielding the breaker unit or switch proper from the cable terminals, and to this end, a wall or member 60 of insulating material is interposed between the breaker unit proper and the terminal blocks 47, see Fig. 1, and is suitably attached to the slab or member 32 of insulating material to move therewith as one piece.

When the junction box is provided with two or more breaker units, it is preferred to separate said units by a partition or wall 62 of insulating material, which is suitably supported by the supporting members or brackets 30 for said units.

From the above description, it will be observed that the breaker unit or units in the box or casing is or are readily accessible and can be connected in circuit and disconnected therefrom in a minimum time and from outside the box or casing, and with the least possible danger to the operator, and further without danger of establishing short circuits within the box with attending damage to the apparatus.

Furthermore, the construction and arrangement is such that a box or casing of minimum size, weight and cost may be used, thereby materially reducing the cost of installations of this character.

The invention is illustrated in a manhole switch in which the junction box or casing is located in the ground represented by the lines 65, but it is not desired to limit the invention in this respect. One embodiment of the invention is herein shown, but it is not desired to limit the invention to the particular construction shown.

What I claim is:—

1. In a switch of the character described, in combination, a box provided with an opening at its top, a slab of insulating material bodily movable into and out of said box through said opening, a supporting member located in said box and upon which said slab is supported in its operative position a material distance above the bottom of the box, means for guiding said slab in its movement, a breaker unit mounted on said slab to move therewith and provided with terminal members, cables inserted into said box, terminal members for said cables supported by the latter independently of the box and within the latter near its upper end, and mechanical means for securing the said terminal members together in fixed relation, said mechanical means being accessible through the opening in the box with the breaker unit in its operative position within the box.

2. In a switch of the character described, in combination, a box provided with an opening at its top, a slab of insulating material bodily movable into and out of said box through said opening, a supporting member located within the box and upon the upper end of which said slab is supported at a material distance from the bottom of said box, guides for said slab extended upwardly from said supporting member, a breaker unit mounted on said slab to move therewith and provided with terminal members near the top of said slab and on opposite sides thereof, cables inserted into said box, terminal members for the cables supported by the latter independently of the box within the latter near its upper end, and on opposite sides of said slab, and an insulating wall interposed between said breaker unit and the circuit terminals on the same side of said insulating slab as the breaker unit.

3. In a switch of the character described, in combination, a box provided with an opening, cables in said box having their ends near said opening, terminal blocks attached to said cables and provided with threaded sockets, a breaker unit bodily movable into and out of said box through said opening, terminal blocks for said breaker unit provided with openings in alignment with the threaded sockets in the cable terminal blocks, and screws extended through the openings in the breaker terminal blocks and engaging the threaded sockets in the cable terminal blocks to draw the latter into firm contact with the breaker terminal blocks, said screws being accessible from outside of the box with the breaker unit in its operative position.

4. In a switch of the character described, in combination, a box provided with a bottom and with an opening in its top, a supporting member erected upon said bottom and extended upwardly a material distance from said bottom, a slab of insulating material bodily movable into and out of said box through said opening and co-operating with said supporting member to be guided thereby in its movements into and out of the box and to be supported in its operative position a material distance above the bottom of said box, a breaker unit mounted on one side of said slab, circuit terminals for said breaker unit carried by said slab and located on opposite sides thereof, and circuit terminals located within said box a material distance above the bottom of the box with which the breaker circuit terminals co-operate.

In testimony whereof, I have signed my name to this specification.

JOHAN M. ANDERSEN.